US007257472B2

(12) United States Patent
Hauer et al.

(10) Patent No.: US 7,257,472 B2
(45) Date of Patent: Aug. 14, 2007

(54) METHOD AND APPARATUS FOR FAULT DIAGNOSIS

(75) Inventors: Wolfgang Hauer, Goeppingen (DE); Robert Newberry, Filderstadt (DE)

(73) Assignee: DaimlerChrysler AG, Stuttgart (DE)

(*) Notice: Subject to any disclaimer, the term of this patent is extended or adjusted under 35 U.S.C. 154(b) by 637 days.

(21) Appl. No.: 10/808,601

(22) Filed: Mar. 25, 2004

(65) Prior Publication Data

US 2004/0249526 A1 Dec. 9, 2004

(30) Foreign Application Priority Data

Mar. 26, 2003 (DE) ................................ 103 13 467

(51) Int. Cl.
*G06F 19/00* (2006.01)

(52) U.S. Cl. ........................................ 701/29; 340/438

(58) Field of Classification Search .................. 701/29, 701/33; 340/438, 439

See application file for complete search history.

(56) References Cited

U.S. PATENT DOCUMENTS

| | | | | |
|---|---|---|---|---|
| 5,935,180 | A * | 8/1999 | Fieramosca et al. | 701/29 |
| 5,950,149 | A * | 9/1999 | Fieramosca et al. | 702/183 |
| 6,006,147 | A * | 12/1999 | Hall et al. | 701/29 |
| 6,430,485 | B1 * | 8/2002 | Hullinger | 701/33 |
| 6,603,394 | B2 * | 8/2003 | Raichle et al. | 340/438 |
| 7,046,638 | B1 * | 5/2006 | Klausner et al. | 370/313 |
| 7,089,098 | B2 * | 8/2006 | Rogg et al. | 701/31 |
| 7,149,206 | B2 * | 12/2006 | Pruzan et al. | 370/349 |
| 2003/0074118 | A1 * | 4/2003 | Rogg et al. | 701/31 |
| 2003/0114980 | A1 * | 6/2003 | Klausner et al. | 701/207 |
| 2005/0267655 | A1 * | 12/2005 | Gessner | 701/29 |
| 2006/0229777 | A1 * | 10/2006 | Hudson et al. | 701/29 |

FOREIGN PATENT DOCUMENTS

| | | |
|---|---|---|
| DE | 43 34 859 A1 | 10/1993 |
| DE | 42 30 796 | 3/1994 |
| DE | 44 46 512 A1 | 12/1994 |
| DE | 195 41 816 A1 | 11/1995 |
| DE | 199 21 846 A1 | 5/1999 |

* cited by examiner

*Primary Examiner*—Gary Chin
(74) *Attorney, Agent, or Firm*—Crowell & Moring LLP

(57) ABSTRACT

A data protocol converter has two interfaces, one of which can be connected to a standard vehicle diagnostic interface, and the other permitting wireless message transfer using a diagnostic handset. A data protocol translator converts the messages from the standard vehicle diagnostic interface into messages having a wireless data format, so that they can be received in the diagnostic handset using the latter's wireless interface. The data protocol converter has a further interface so that it can be connected to a second standard diagnostic interface according to a different standard. The data protocol translator can convert the messages from the second standard vehicle diagnostic interface into messages having a wireless data format.

8 Claims, 1 Drawing Sheet

METHOD AND APPARATUS FOR FAULT DIAGNOSIS

BACKGROUND AND SUMMARY OF THE INVENTION

This application claims the priority of German patent document 103 13 467.0, filed Mar. 26, 2003 the disclosure of which is expressly incorporated by reference herein.

The invention relates to a method for fault diagnosis and reprogramming control information in a control unit for a vehicle.

In a control unit of the type referred to, messages stored in a memory area are transferred via an interface to a diagnostic unit which can be operated within the range of 100 meters around the vehicle. Particular messages are selected from the total set of messages, and diagnostic information is created for components of the vehicle based thereon. The messages are transferred to the diagnostic handset, which can be moved independently of the vehicle, via a wireless interface. The invention also relates to a data protocol converter which is required for this method and has two interfaces. One interface can be connected to a standard diagnostic interface in the vehicle according to a first standard, and the second interface permits wireless message transfer using a diagnostic handset.

In conventional cable-oriented diagnostic methods, the diagnostic computer is plugged onto a standard diagnostic interface on the vehicle, so that diagnostic codes and data bus information can be read out on a portable computer. The user can display, for example, the bus activity or the data bus communication between the different control units. Today, it is also possible to use the wired standard diagnostic interfaces to transfer parameters to a memory area in a control unit, for example in order to readjust the injection times in the vehicles. German patent document DE 195 41 816 A1 discloses an example of a conventional diagnostic system which is coupled to a vehicle via a wired interface in order to read out diagnostic data.

In addition, diagnostic methods for vehicles are known in which diagnostic data are transferred from the vehicle to a service station using a wireless interface (for example a mobile telephone interface). In contrast to the conventional diagnostic methods for vehicles in which a computer is plugged onto the engine or onto various control units using cables, in this case the diagnostic data are transferred to the diagnostic computer wirelessly. (Such diagnostic methods are also referred to as remote diagnosis.)

German patent document DE 44 46 512 A1 discloses an apparatus for performing a vehicle test and for evaluating vehicle faults. Using a conventional mobile radio telephone to send fault reports or failure reports, a diagnosis is created for the vehicle. It is also possible to receive data from the vehicle using the mobile radio part, in order to transfer control information for correcting faults to the control unit.

U.S. Pat. No. 6,430,485 B1 discloses a method and apparatus for diagnosis in an electrical vehicle control system, in which an evaluation and programming station is provided in the form of a programmable, portable computer. This base station has a wireless network diagnostic interface which can also be used to program the vehicle. If the vehicle is brought into close range of the test environment, a wireless network is set up between the portable diagnostic computer and the vehicle permitting wireless diagnosis and reprogramming of the vehicle. In the known system, diagnostic data and programming data for the vehicles are transferred using the wireless interface of a base station provided specifically in the vehicle. One problem of the disclosed system is that every vehicle needs to be reequipped with the base station in order to permit the wireless diagnosis.

German patent document DE 43 34 859 A1 discloses a device for testing and programming electronic control units in a motor vehicle. The device for testing and programming electronic control units is in the form of a wireless diagnostic unit which, instead of the wireless access key for the vehicle, communicates with a transceiver unit in the lock system, and thereby transfers diagnostic and programming data to the central control unit in the vehicle.

German patent document DE 199 21 846 A1 exhibits a portable test unit having a modem. The portable test unit can be coupled to a wireless interface using a mobile radio, and can use the latter to receive diagnostic fault codes from the vehicle. The diagnostic test apparatus with the portable test unit stores the fault codes and uses the mobile telephone to transfer the fault diagnosis to a workshop, which is independent of the vehicle, for the purpose of fault correction. The diagnostic apparatus can be connected to a test unit in the vehicle using a diagnostic/test connector in the motor vehicle. This diagnostic unit is fitted on the vehicle and uses its mobile telephone device to transfer the diagnostic data to an external service station, which may be many kilometers away from the vehicle.

One object of the present invention is to provide a diagnostic method and a data protocol converter which can be used therein, thus simplifying diagnosis within a workshop in the relatively close surroundings of the vehicle. In particular, the aim is to allow diagnosis to be used in vehicles, which have different vehicle data buses, without the need to provide a separate diagnostic unit or a new diagnostic interface for every diagnostic environment.

These and other objects and advantages are achieved by the method and apparatus according to the invention, in which the data transferred to the vehicle provide a piece of software for improved operation of individual components in the vehicle, parameters for fault-free operation of components, or a hardware description relating to the hardware configuration of reconfigurable hardware. Reconfigurable hardware refers, for example, to “FPGAs” (Field Programmable Gate Arrays). The software, the parameters or the hardware description are transferred from the diagnostic handset directly to the vehicle using the wireless interface, and the messages are converted in the data protocol converter into a first message protocol (for example, a CAN data bus protocol), and also into the message protocol for another vehicle data bus. The other message protocol may relate to a FlexRay, MOST, CAN, Firewire or J1850 data bus.

The method according to the invention for fault diagnosis in a control unit involves the use of a data protocol converter which can send and receive first a message protocol for a first vehicle data bus and second message protocol for a second vehicle data bus. This means that it is possible first to use the fault diagnosis method with a European (for example, German) diagnostic standard. In addition, because the interface has the further message protocol, the portable diagnostic unit can be used on a standard vehicle diagnostic interface with a non-European standard. The data protocol converter according to the present invention can be used to save considerable costs, since it is not necessary to produce a dedicated diagnostic unit for every type of transport means. The diagnostic unit is coupled to the data protocol converter using a wireless interface (for example, according to the Bluetooth standard), and the diagnostic or programming data are simultaneously converted in the data protocol converter into two different message protocols for different vehicle data buses. The data protocol converter can be coupled by its two interfaces to the standard diagnostic vehicle interfaces of the data buses as required.

In the method according to the invention for fault diagnosis, the data protocol converter is used more or less as an adapter which, during a diagnosis, is simply plugged onto the standard vehicle diagnostic interface, and the wireless transceiver unit is then used to transfer the diagnostic data and the reprogramming data to and from the diagnostic unit.

The data protocol converter can also have a third interface for a message protocol for a vehicle data bus, so that it can be coupled to a third standard diagnostic interface in a vehicle. By way of example, for European use, the diagnostic data may be output using a message protocol for the CAN data bus, while the data protocol converter uses a message protocol for the J1850 data bus when an American standard diagnostic interface is being used. The third message protocol can be implemented according to the data bus standard for an Asian transport-means data bus. The use of the data protocol converter according to the invention allows various diagnostic data to be translated in accordance with a national standard, such that the diagnostic handset is able to receive diagnostic data, and the reprogramming data for the vehicle control unit are also transferred to the appropriate message protocol for the transport-means data bus used.

It is also possible to simulate a message protocol for a data bus system according to an old standard using the data protocol converter, so that it is possible to diagnose even relatively old vehicles using the standard diagnostic interface if the workshops now no longer have a suitable diagnostic unit.

In one embodiment of the invention, the data protocol converter has at least two interfaces, including one that can be connected to a standard diagnostic interface in a vehicle according to a national, or old standard, and a second interface which permits wireless message transfer using a diagnostic handset. The data protocol converter has a data protocol translator which converts messages from the standard diagnostic interface in the vehicle into messages having a wireless data format, so that the messages can be received in the diagnostic handset using the latter's wireless interface. The data protocol converter has a further interface so that it can be connected to a second standard diagnostic interface according to a different standard. The data protocol translator converts the messages from the second standard vehicle diagnostic interface into messages having a wireless data format.

A typical diagnostic unit allows workshop personnel to read the diagnostic codes from vehicle control units. Particularly in a workshop or on an assembly line, the wireless interface allows the portable diagnostic unit of the present invention to be used particularly well up to a range of approximately 100 meters. The diagnostic unit can be used to monitor bus activities and communication between different nodes (i.e., control units) via a data bus system. The control unit software is reprogrammed to correct diagnosed faults by transferring software to a flash memory in a control unit. To this end, the data are transferred to the control unit's flash memory via the data protocol converter and the diagnostic interface in the control unit.

The data protocol converter of the present invention allows workshop personnel to access vehicles with a CAN data bus, and to access vehicles with the J1850 data bus, as well. In this case, the same diagnostic handset can be used to work with the wireless interface when a vehicle according to either the American or German standard is being used. It is not necessary to change the diagnostic handset in this instance; rather a data protocol converter is simply plugged onto the respective standard diagnostic interface as an adapter. The diagnostic handset has a graphical user interface and an input unit which the user of the diagnostic handset can use to control the diagnostic unit.

In another embodiment of the invention, the data protocol converter has a wireless interface (particularly according to the Bluetooth standard), so that the diagnostic data can be displayed on a portable computer that can be programmed specifically for this purpose. The diagnostic protocol translator permits transfer of messages from the diagnostic handset to the data bus in the vehicle. In this case, the standard diagnostic interface accesses a vehicle data bus, such as a CAN data bus or J1850 data bus.

The data protocol converter has a means for selecting the diagnostic data within the message stream in the vehicle. In this case, the means selects the necessary diagnostic data from the various messages on the data bus and transfers them to the diagnostic handset using the wireless interface. To reprogram the control information in control units, both flash memories and FPGAs (Field Programmable Gate Arrays), (i.e., reconfigurable hardware modules) are provided within the control units. The software or the hardware description is preferably stored in a memory in the diagnostic handset and can be downloaded to a control unit using the wireless interface when required. In this case, the software for reprogramming can be transferred either to a CAN data bus or to one of the other data bus systems using the data protocol converter's interfaces.

Alternatively, the data protocol converter can be used without the diagnostic handset for the purpose of translating the messages from one vehicle data bus to the other vehicle data bus. This results in a gateway module which can be coupled externally to the standard diagnostic interfaces in the data bus systems and uses the interfaces to output the respective data protocol for the vehicle data bus system. It is also possible to use the data protocol converter for bus monitoring, with the messages on the data bus being monitored and being checked for a particular event.

If the data protocol converter is used as a gateway which is coupled to the standard diagnostic interfaces in a data bus system, the messages from the following data protocols can be translated into a respective data protocol for another data bus system: RS232, Bluetooth, CAN, K-Line and J1850 data formats, which are supported by the data protocol translator. The data protocol converter can preferably be configured for the different data protocols, so that, for example, CAN messages are translated either to the J1850 format or to the Bluetooth format. To this end, the data protocol converter can be configured differently and the data are transferred to the data bus via the standard diagnostic interface.

Other objects, advantages and novel features of the present invention will become apparent from the following detailed description of the invention when considered in conjunction with the accompanying drawings

BRIEF DESCRIPTION OF THE DRAWINGS

The single FIGURE of the drawing is a schematic overview of a vehicle data bus system having a control unit and a data protocol converter according to the present invention.

DETAILED DESCRIPTION OF THE DRAWINGS

Figure 1:
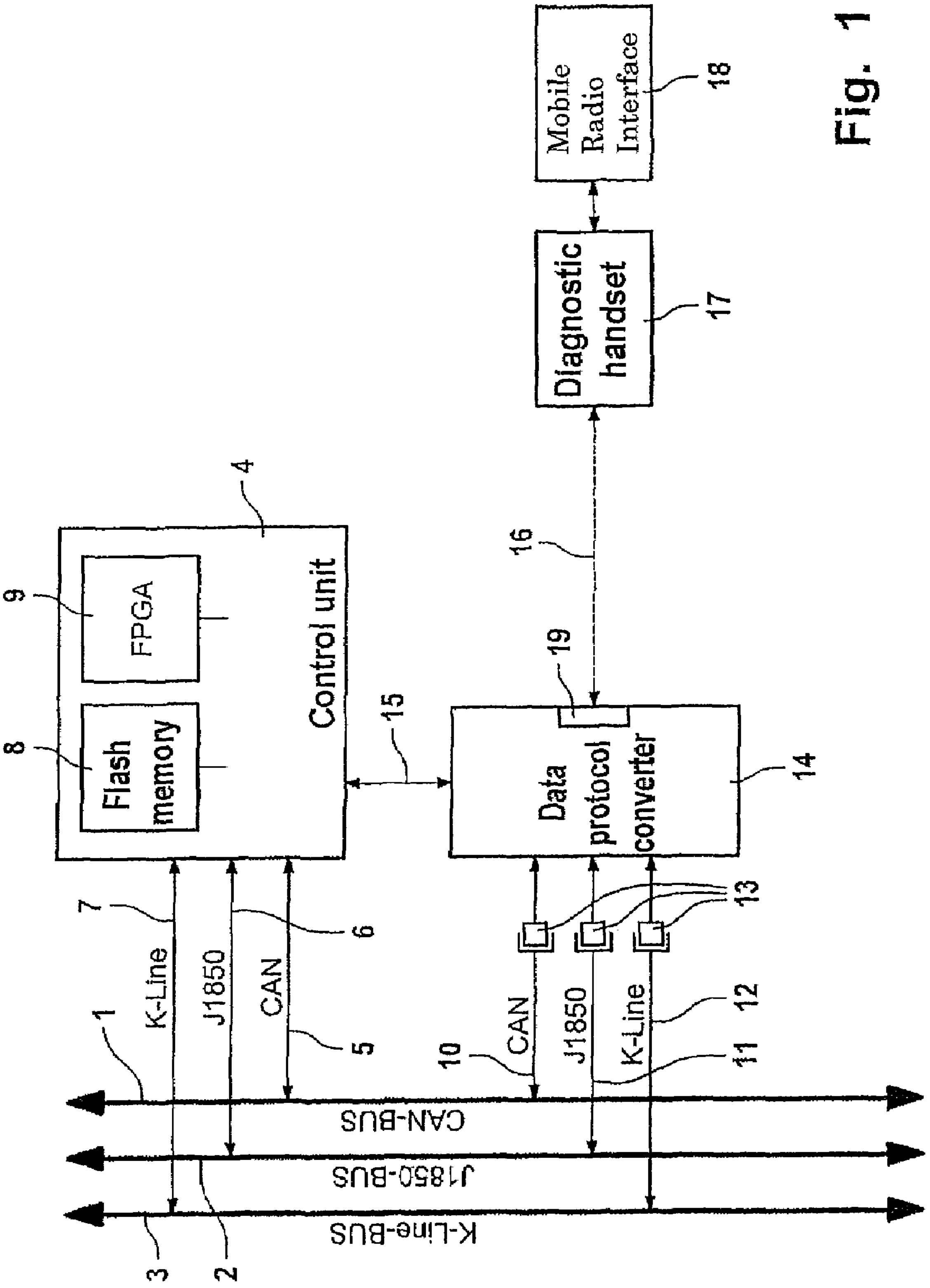

As shown in the figure, the vehicle data bus system includes a CAN data bus 1, a J1850 data bus 2 and a K-Line data bus 3. A control unit 4 is connected to one or more of these data buses 1-3, via the respective interface 5, 6, 7. The control unit 4 preferably has a flash memory 8 and, as reconfigurable hardware, an FPGA 9. An FPGA module is a memory logic unit whose memory cells can be wired to one another variably on the basis of a hardware description. The FPGA module can be used to simulate all common hardware modules, for example logic modules, microprocessors, interfaces, inter alia.

On the one hand, the control unit 4 may be in the form of a standard vehicle control unit, and hardwired only to the CAN bus 1. On the other hand, the control unit 4 may also be in the form of a gateway, so that a plurality of data buses are coupled to it, particularly a J1850 bus 2 and a CAN bus 1. Provided on each data bus 1, 2, 3 is a standard diagnostic interface 10, 11, 12, each having a plug contact 13 to which arbitrary diagnostic units can be coupled. In the normal vehicle driving state, these plug contacts 13 may be provided without an associated diagnostic unit or without an associated data protocol converter 14.

When required (i.e., during a diagnosis), the data protocol converter 14 can be coupled to the standard diagnostic interfaces 10-12 using its plug contacts 13 and can also be wired directly to the control unit 4 using a JTAG interface 15. Coupled to the data protocol converter 14 using a wireless interface 16 is a diagnostic handset 17 which can display the detected diagnostic data and, if appropriate, has a mobile radio interface 18 for coupling using a mobile telephone.

The data protocol converter 14 is in the form of an adapter which has a transceiver unit 19 for transferring wireless messages to and from the diagnostic handset 17. The data protocol converter 14 also has transceiver units for receiving messages from the various data buses 1-3 using the standard diagnostic interfaces 10-12, and converting them into the other data bus protocol. To this extent, the data protocol converter 14 acts as a gateway bridge which can translate messages in one particular data protocol into messages in another data protocol, and is also able to select diagnostic data from the various messages, so as to transfer it to the diagnostic handset 17.

The diagnostic handset 17 has a display for displaying the diagnostic data, and a memory for storing the diagnostic data and, if appropriate, for providing reprogramming data for the control unit 4 from an associated memory means. The reprogramming data are then transferred to the data protocol converter 14 using the wireless interface 16, and from there they are transferred to the control unit 4 either i) using the JTAG interface 15 (which corresponds to an American diagnostic standard), or ii) using standard diagnostic interfaces 10-12 and then again using the transceiver unit 5-7, to be stored in the flash memory in the control unit 4 for the purpose of replacing the faulty software or the superseded data.

The data protocol converter allows the use of a single diagnostic handset 17 together with data buses 1-3 with various data protocols. This is necessary when a diagnostic handset 17 is to be used to request diagnostic data within vehicles that are of different nationality (meaning, for example, that first a European and second an American diagnostic standard is applied). The data protocol converter 14 translates the various data protocols into a message format which can be read by the diagnostic handset 17. In addition, the reprogramming data from the diagnostic handset 17 are converted by the data protocol converter 14 into a message format which can be transferred to the control unit 4 using the different data buses 1-3. The data protocol converter 14 is used to reprogram the vehicle data bus system with the associated control units 4 using the respective data bus systems 1-3. In this case, it is possible to reconfigure both the flash memory 8 and the FPGA 9.

The reprogramming information can be downloaded in the data protocol converter 14 using the wireless interface 16 and can be buffered-stored there as appropriate. The data protocol converter 14 can also be used without the diagnostic unit 17 for the purpose of translating the various data bus messages and, in this case, can be used as a plug-on gateway which is plugged onto the data bus systems 1-3 using the standard diagnostic interfaces 10-12. The data protocol converter can also be used to monitor sensors and actuators, which are coupled directly to the data buses 1-3. In this case, the data protocol converter 14 can also facilitate the development of a sensor system for coupling to the data bus systems 1-3. In this context, diagnostic data can be read out and the sensor equipment can be better matched to the data bus system 1-3 based on these data.

The diagnostic handset 17 allows vehicle diagnosis without troublesome wiring to the data bus system. The user in the workshop or on the assembly line can program a PDA as a diagnostic handset 17. The diagnostic handset 17 can use the data protocol converter 14 to convert the data as appropriate into a message format and can transfer them to the control unit(s) 4 via the data bus system 1-3.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for performing at least one of fault diagnosis and control information reprogramming in a vehicle control unit having messages stored in a memory area that are transferable to a diagnostic handset that is operable within a range of 100 m around a vehicle, comprising:

selecting particular messages from a total set of said messages stored in the memory area, transferring the particular messages from the memory area over any of a plurality of different vehicle data buses having a plurality of different message protocols to a data protocol converter, converting the particular messages from one of said message protocols, unknown to the diagnostic handset, into a data format for subsequent transfer to the diagnostic handset via a wireless interface using the data protocol converter, outputting particular data, including any of software for improved vehicle component operation, parameters for improved vehicle component operation, and a vehicle hardware description relating to a configuration of reconfigurable vehicle hardware, with the diagnostic handset, obtaining the fault diagnosis from said diagnostic handset when said fault diagnosis is performed, and transferring said particular data directly from the diagnostic handset to the data protocol converter via the wireless interface, converting the particular data received from the diagnostic handset into said one of said message protocols permitting transfer of the particular data over any of a plurality of different vehicle data busses, and transferring the particular data to the control unit over one of said plurality of different vehicle data buses when said control information reprogramming is performed.

2. The method according to claim 1, wherein said wireless interface is made according to the Bluetooth standard.

3. The method according to claim 1, wherein said one of said message protocols is for a J1850 data bus or CAN data bus.

4. A data protocol converter for use in the method of claim 1, comprising:

a first interface that is connectable to a standard vehicle diagnostic interface, and a second interface that is adapted to permit wireless message transfer via said diagnostic handset.

5. The data protocol converter according to claim 4, wherein the wireless message transfer is made via the Bluetooth standard, so that the diagnostic data can be displayed on a portable computer.

6. The data protocol converter according to claim 4, wherein the data protocol converter permits transfer of messages from the diagnostic handset to the vehicle.

7. The data protocol converter according to claim 4, further comprising interfaces to a CAN data bus and to a J1850 data bus.

8. The data protocol converter according to claim 4, wherein the data protocol converter can be retrofitted as an adapter to allow data transfer from the control unit to the diagnostic handset and from one data bus to a further data bus.

* * * * *